(12) United States Patent
Dajoh et al.

(10) Patent No.: US 11,776,425 B1
(45) Date of Patent: Oct. 3, 2023

(54) HARDWARE SIMULATION LOGIC CIRCUIT BENCH

(71) Applicants: Asim Dajoh, Jeddah (SA); Mohammed Altalhi, Jeddah (SA)

(72) Inventors: Asim Dajoh, Jeddah (SA); Mohammed Altalhi, Jeddah (SA)

( * ) Notice: Subject to any disclaimer, the term of this patent is extended or adjusted under 35 U.S.C. 154(b) by 0 days.

(21) Appl. No.: 18/058,811

(22) Filed: Nov. 25, 2022

(51) Int. Cl.
*G09B 23/18* (2006.01)

(52) U.S. Cl.
CPC .................. *G09B 23/186* (2013.01)

(58) Field of Classification Search
CPC .................................................. G09B 23/186
USPC ........................................................ 434/118
See application file for complete search history.

(56) References Cited

U.S. PATENT DOCUMENTS

2007/0219771 A1\* 9/2007 Verheyen ................ G06F 30/33
703/15

\* cited by examiner

*Primary Examiner* — Kesha Frisby
(74) *Attorney, Agent, or Firm* — WC&F IP

(57) ABSTRACT

Examples include a frame supporting a holding slot with guide surfaces along an axis from a slot power connector. A first and a second circuit board device are movably supported by the guide surfaces. Each includes a first side edge, a second side edge, and a laterally stackable power rail extending from a first connector on the first side edge to a second connector on the second side edge. Each includes a guide structure moveably engaging the slot guide surfaces. In a state, the first circuit board device is adjacent the slot power connector. The second circuit board device is adjacent the first circuit board device. the first connector of the first circuit board device is aligned and coupled with the slot power connector, the second connector of the first circuit board device is aligned and coupled with the first connector of the second circuit board device.

13 Claims, 12 Drawing Sheets

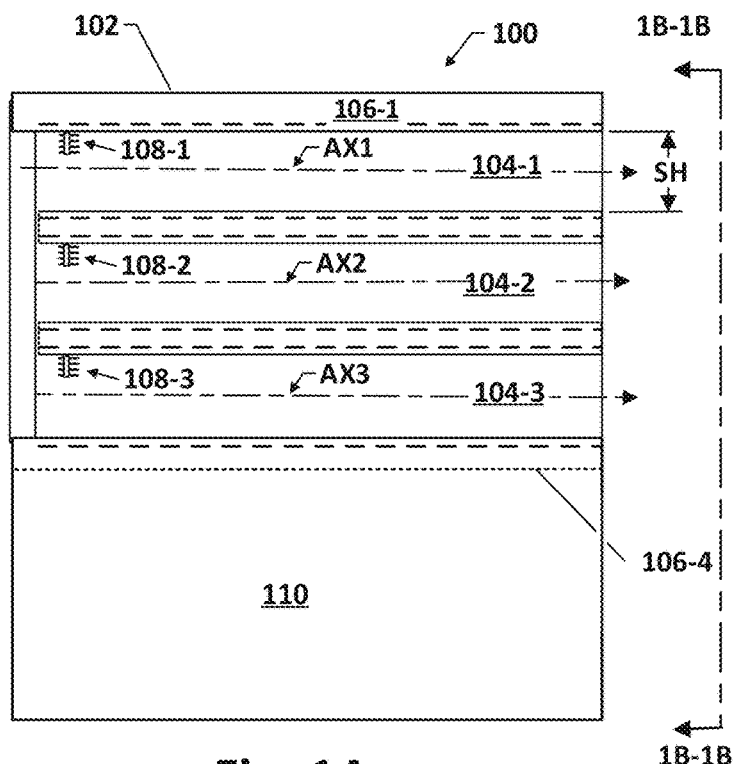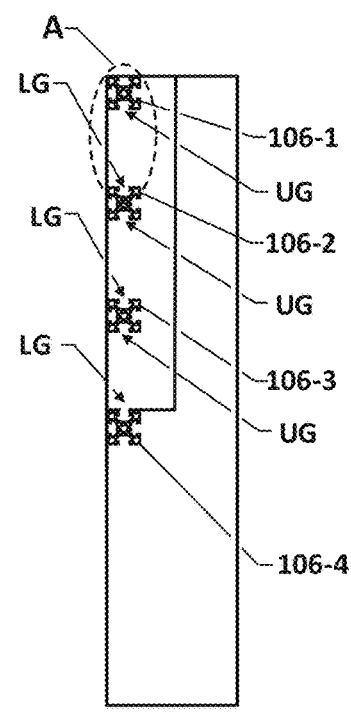
Fig. 1A  Fig. 1B
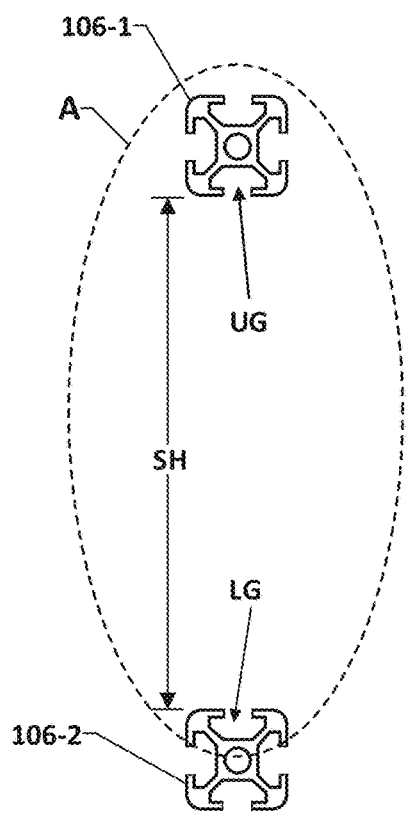
Fig. 1C

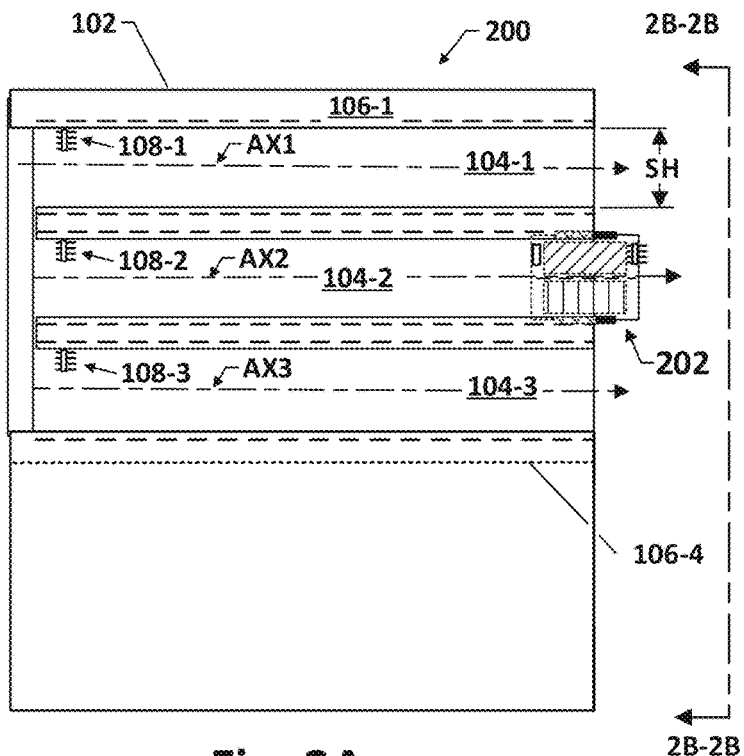
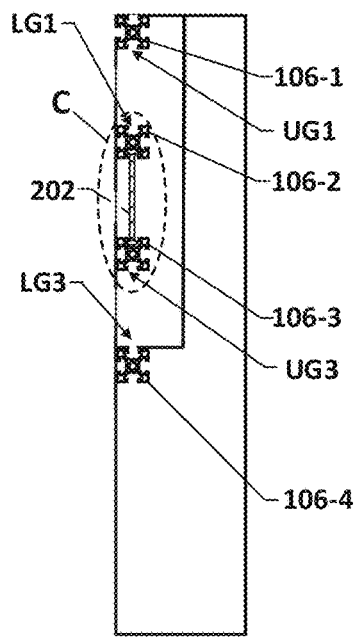
Fig. 2A
Fig. 2B
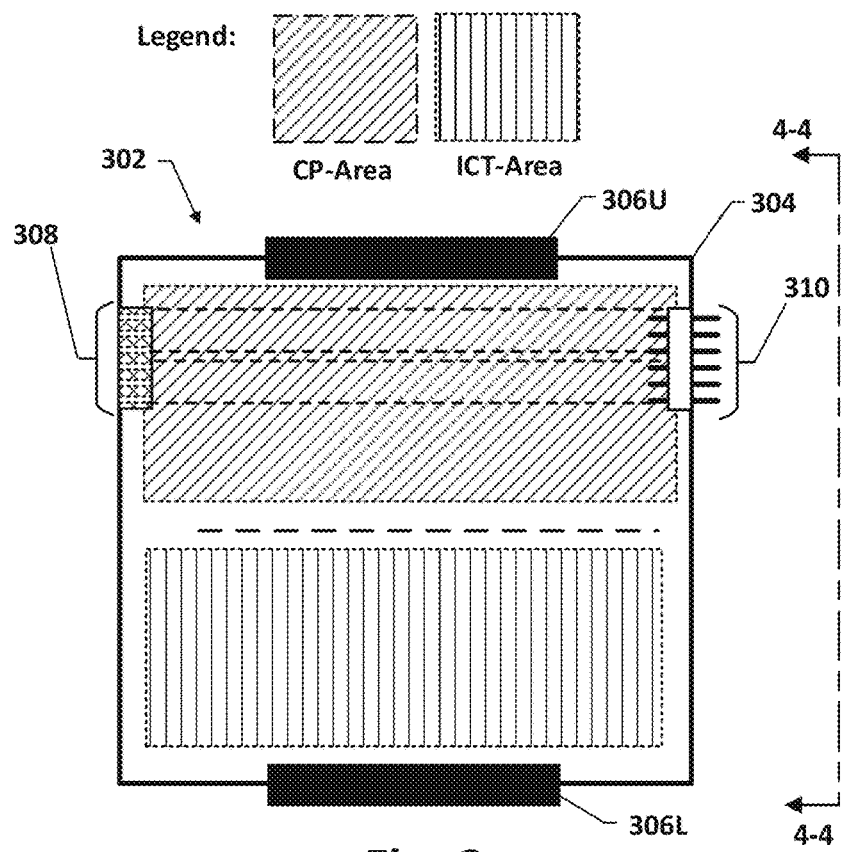
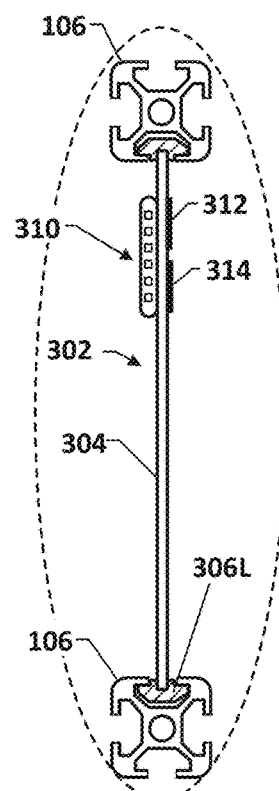
Fig. 3
Fig. 4

Fig. 17A
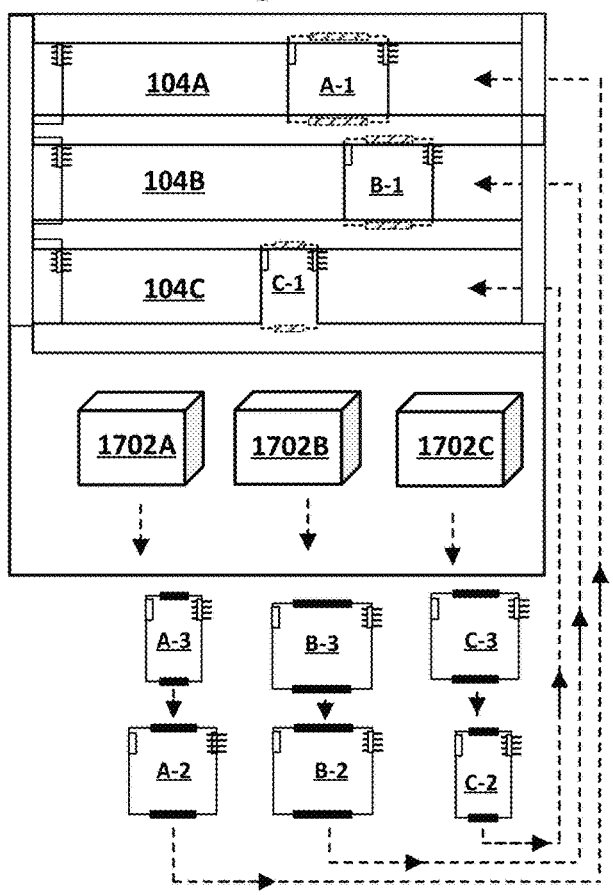
Fig. 17B
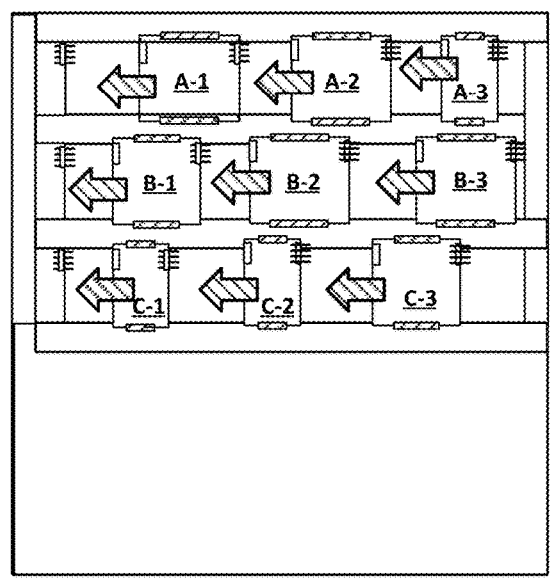
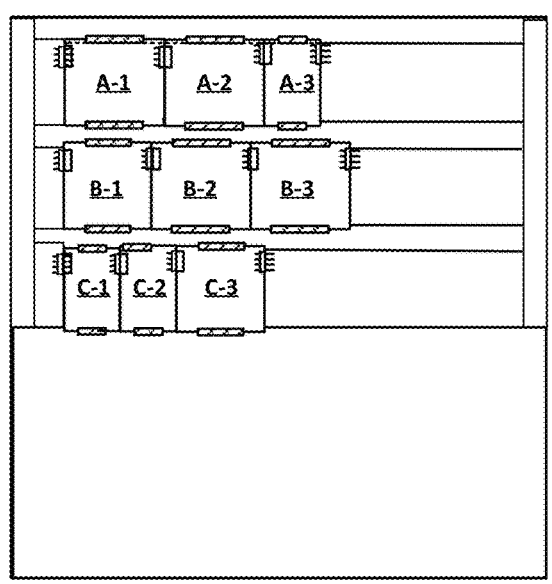
Fig. 17C

HARDWARE SIMULATION LOGIC CIRCUIT BENCH

TECHNICAL FIELD

This disclosure generally relates to hardware logic circuit demonstration devices and, more particularly, to teaching environment directed, user-interactive, highly visible logic structure, reconfigurable hardware logic circuit demonstration systems and devices.

BACKGROUND

Various fields of engineering include or interface with one or more of operation, analysis, design, and/or upgrade of logic circuits, and therefore require an understanding of such circuits' basic principles and operations. Engineering school techniques for providing students such understanding consists of in-class lectures with reference to textbooks, and assigning students investigative projects. Classroom only education can have shortcomings, as it requires conceptualizing with no experiential reference.

Breadboarding is one well-known technique for engineering students, e.g., assignment based investigation of logic circuit solutions. Breadboarding, though, can have shortcomings. For example, the technique requires considerable time required to configure and wire the breadboard. The time includes, for example, for example, finding data to construct a cross-mapping of the breadboard pins to the mapping of the integrated circuit (IC) chips. After the student has the mapping, the student installs the IC chips in the breadboard pin socket, then proceeds to wiring the ICs together. When the student finally succeeds, energy and focus can be lost.

SUMMARY

Embodiments include novel structured hardware simulation building blocks, and corresponding novel structures and methods for receiving the building blocks, and for moveably supporting, providing user-visible rapid interconnecting of, and built-in powering of the building blocks for users' ready assembly into, and observation, testing, and analysis, of operative hardware models of logic circuits.

According to various embodiments, building block structure can comprise substrate structure having a functionality and purpose based partitioning of its surface area. Partitioning can include allocating a region for devices, e.g., semiconductor integrated circuit (IC) chip implementations of Boolean logic gates, which users cannot directly interact with, and another regions for receiving user interactions, e.g., manual switches that connect to the ICs, and user interactive interconnects between different building blocks. According to one or more embodiments, examples functionalities and purposes of this partitioning include, but are not limited to accelerating or otherwise assisting users in building mental association between specific inputs to the building blocks, e.g., from other building blocks, or from user input, and specific logic functions or operations performed in the building block.

Novel structures and capabilities for moveably supporting and enabling users to rapidly assemble the hardware logic building blocks can include, for example, a frame-supported plurality of holding slots, each extending linearly along an axis. According to one or more embodiments, the plurality of holding slot axes can extend in a common plane. Features and benefits of this arrangement can include, but are not limited to providing users with concurrent visibility of multiple user-related information distributed over multiple interactive surfaces.

In one more embodiments the linear guide surfaces can include, but are not limited to a slot or a pair of opposing slots, having, e.g., respective "T" shaped cross-sections and extending lengthwise parallel to the axis. In such embodiments, the building blocks can include the substrate having, e.g., a top and a bottom edge, or e.g., an "upper" and "lower" edge, spaced apart by approximately a board height and, mounted or secured to the these opposing edges, an upper engagement member and a lower engagement structures.

For purposes of consistency and brevity, further description herein will alternatively and interchangeably recite the logical building blocks as one among "slot-supported" and "slot supportable" circuit board devices depending on context that is readily determined by POSITAs having possession of and having read the instant discourse.

In one more embodiments the linear guide surfaces can include, but are not limited to a slot or a pair of opposing slots, having, e.g., respective "T" shaped cross-sections and extending lengthwise parallel to the axis. In such embodiments, the building blocks can include the substrate having, e.g., a top and a bottom edge, or e.g., an "upper" and "lower" edge, spaced apart by approximately a board height and, mounted or secured to the these opposing edges, an upper engagement member and a lower engagement structures.

This Summary identifies example features and aspects and is not an exclusive or exhaustive description of disclosed subject matter. Whether features or aspects are included in or omitted from this Summary is not intended as indicative of relative importance of such features or aspects.

BRIEF DESCRIPTION OF THE DRAWINGS

FIG. 1A shows a front projection of an example holding slot configuration of a user-interactive, high visibility logic structure, reconfigurable hardware simulation logic circuit bench according to various embodiments; FIG. 1B shows, from FIG. 1A side-view projection 1B-1B, one implementation of holding slot linear supporting guides for laterally stackable hardware logic circuit card devices in systems and methods according to one or more embodiments; and FIG. 1C shows an enlarged view of FIG. 1B region "A."

FIG. 2A shows on the FIG. 1A projection plane a snapshot partially inserted position of an example laterally stackable hardware logic circuit card device according to various embodiments; FIG. 2B shows, from FIG. 2A side-view projection 2B-2B, a side-profile configuration of the example laterally stackable hardware logic circuit card device and cooperative engagements with the holding slot supporting guides.

FIG. 3 shows a front board surface view of one example configuration of a logic functionality generic structure for laterally stackable, concurrently visible holding slot supportable hardware logic simulation circuit card devices according to various embodiments, including, but not limited to, a logic structure visibility improving allocation of device board surface, and laterally stackable power rail.

FIG. 4 shows, through overlay of side-projection 4-4 of FIG. 3 on an enlarged view of region "C" of the FIG. 2B example profile for holding slot upper guide-lower guide, a cooperative arrangement of holding slot upper guide—lower guide and slot supportable card device upper engagement—lower engagement structure for high visibility hardware simulation logic circuit bench apparatuses and methods according to various embodiments.

FIG. 17A shows a snapshot state in an example configuring, via selecting appropriate holding slot supported logic circuit card devices from library bins of a multiple logic type hardware logic circuit card device library, of a user-interactive, high visibility hardware simulation logic circuit bench according to various embodiments; FIG. 17B shows a subsequent snapshot of a subsequent, still-not-fully assembled state, of all selected library resource hardware logic circuit card devices inserted in and supported by the holding slots; and FIG. 17C shows an example assembled configuration of the selected and inserted holding slot supported logic circuit card devices from the library.

DETAILED DESCRIPTION

Figure 5:
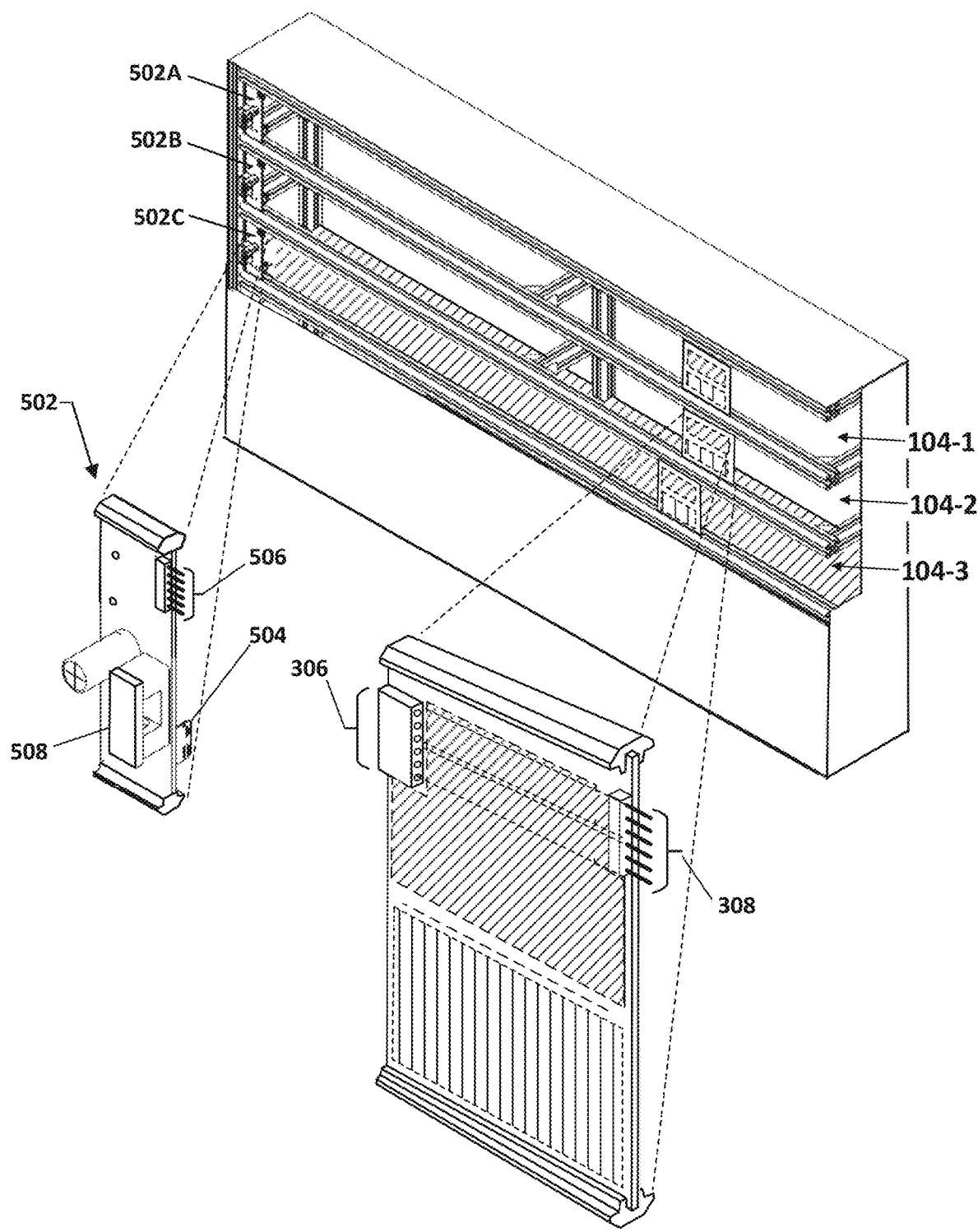
FIG. 5 shows a perspective view of a three holding slot configuration according to one or more embodiments, with example per-slot auxiliary card power rail drivers, and a teaching-directed logic functionality based slot allocation, for user-interactive, high visibility logic structure, reconfigurable hardware simulation logic circuit bench apparatuses and methods , according to one or more embodiments.

Apparatuses according to one or more embodiments can include a frame supporting a plurality of holding slots, each extending along an axis from a holding slot base end. In one or more embodiments, each holding slot can be shaped and dimensioned to accommodate a plurality of holding slot supportable logic circuit card devices. For brevity, description hereinafter will alternatively recite "holding slot supportable logic circuit card devices" as "HSS logic device." It will be understood that as used herein "HSS logic device" has no intrinsic meaning, express or implied. According to various embodiments the holding slot structure and corresponding structure of HSS logic devices can be configured to receive and moveably support, in each holding slot, a plurality of the HSS logic devices. Features of "movably support," as used in the disclosure, include enabling a user to introduce HSS logic devices into, and remove HSS logic devices from the holding slot, and to enable users to selectively urge, into a substantially uninterrupted concatenation, a spatial sequence of HSS logic devices having intervening spaces. According to various embodiments, further include moveably supporting a spatial sequence of and a concatenation of HSS logic devices in a co-planar arrangement. The coplanar arrangement, and structural features providing same, can further provide for example and without limitation, user access to and, for some applications, audience view of user interact surfaces of the logic circuit card devices.

According to one or more embodiments, the HSS logic device can be grouped or categorized and, without limitation, embodiments ca include be a three-type grouping, one group being "input logic type," another being "controller process logic type," and the remaining group being "output logic type." According to various embodiments, structural features can include a particular mapping or other fixed or rule-based based correspondence between HSS logic device type and its assigned holding slot.

Features and benefits of the fixed assignment can include, but are not limited to, reduction in non-constructive confusion in selecting the holding slot, and corresponding improvement in one or more layout quality metrics.

It will be understood that as description hereinafter each of "grouped" and "categorized" as the grammatical variations of each will be understood to mean "grouped, or categorized, or both," or the grammatical variation thereof that corresponds to the specific wording.

Regarding specific functionalities of input type logic devices, functionality of input cards can include sourcing of signals to be received by and processed by control cards. Examples of input type include, but are not limited to, manually actuatable signal sources, such as but not limited to, push button, rotary adjustment knob with continuous movement adjustment knob, rotary discrete multi-position selection knob, sliding switch, and toggle switch, and circuit generated signal sources, such as a clock generator or anything that is considered to be input to system or input data to control.

According to various embodiments functionality of control type logic devices can encompass, for example and without limitation, algorithmic processing on one more independent variables., e.g., and not limited to, detection or measurement signals, scanner data, financial data, and user inputs at user interfaces. In an implementation, control type logic circuit cards can be divided into four types of boards, gates, combinational, sequential, complex. Each type of control card can hold specific function where those are followed carefully and guided by logic circuit books including but not limiting to Digital Design by M. Morris Mano. Complex control cards where advanced digital logic circuits can stand out can include, but are not limited to, Microprocessors, Microcontrollers, ADC, DAC, FPGA or any kind of circuit that have a complicated and mix of gates, combinational and sequential circuits.

In one or more embodiments, the logic cards can, but do not necessarily have a fixed width, e.g., 84 mm width but variable length. Each card can be partitioned into two regions, the circuit part and the user interact part.

Regarding output type logic devices, example functionalities can include anything reasonably considered as or capable of being considered as, considered to give an output to the system, example LEDs, seven segments, clock sequence viewer, or anything that is considered to be output of the system output data from the control.

FIG. 1A shows a front projection of one example arrangement of three-slot configuration user-interactive, high visibility hardware simulation logic circuit bench 100 according to various embodiments. For brevity, description hereinafter will alternatively substitute Applicant's coined letter sequence "UIHV" for the word sequence "user-interactive, high visibility." It will be understood that, as used herein, "UIHV" is a coined letter sequence without intrinsic meaning.

According to various embodiments, implementations of the UIHV hardware simulation logic circuit bench 100 can comprise a frame 102 that can be configured to support three holding slots, such as the example first holding slot 104-1, second holding slot 104-2, and third holding slot 104-3. For brevity, description hereinafter will alternatively reference the first, second, and third holding slots 104-1, 104-2, and 104-3 collectively as "holding slots 104, and generically as "a holding slot 104" or "the holding slot 104," depending on context.

The holding slots 104 can extend from a respective holding slot base end, along respective axes, such as the FIG. 1A examples AX1, AX2, and AX3. For purposes of description , the holding slot axes AX1, AX2, and AX3 will be alternatively referenced herein, collectively, as "holding slot axes AX."

In contexts herein such as the above recitation "the frame 102 . . . to support . . . [the three] holding slots," it will be understood that the term "supports," can encompass implementations of one or all of the holding slots 104 comprising a physical portion, or an inseparable structure distributed feature of the frame 102 that performs, or provides functionalities of the holding slot 104.

Viewed on the FIG. 1A sheet, the example's holding slot 104 base ends are located at the left of the viewing area, opposite the ends of the holding slot axes AX marked with respective arrows. According to one or more embodiments, holding slot 104 structures at the end opposite the holding slot 104 base ends, or elsewhere along the holding slot 104 can be particularly configured to expedite removing and inserting logic circuit card devices. In an embodiment such structure can comprise an open end, as visible in FIG. 1B.

As described above, according to various embodiments functionality of the holding slots 104 comprises movably supporting user-inserted combinations of particularly configured logic circuit board devices. Aspects of "movably supporting" can include co-planar support surfaces, and according to various embodiments, structural combinations providing this and other functionality can include, in the holding slots 104, linear guide surfaces extending parallel to the holding slot axes AX. For example, in the FIG. 1A-1B configuration, the illustrated frame 102 includes four T-slot rails, namely, a first T-slot rail 106-1, second T-slot rail 106-2, third T-slot rail 106-3, and fourth T-slot rail 106, hereinafter alternatively referred to collectively as "T-slot rails 106."

The example T-slot rails 106, as visible in FIG. 1B, are formed as generally rectangular bars having, a respective lengthwise extending recess having a T-slot cross-section recess (hereinafter alternatively referred to as "T-slot"). The T-slot rails 106 can be referenced as a first holding slot T-Slot rail pair 106-1, 106-2, a second holding slot T-Slot rail pair 106-2, 106-3, and a third holding slot T-Slot rail pair 106-3, 106-4. As more clearly seen in the FIG. 1C enlargement of FIG. 1B viewing area "A," each of three T-Slot rail pairs provides, as an extruded structure in this example, an upper guide, generically labeled "UG" and, spaced slot height "SH" below the upper guide UG, a lower guide "LG."

In accordance with several embodiments, a slot power connector, such as the FIG. 1A example first slot power connector 108-1, second slot power connector 108-2, and third slot power connector 108-3 (collectively "slot power connectors 108") arranged at the respective slot base ends of the FIG. 1A-1C holding slots 104. An example holding slot supportable, e.g., card configured holding slot supportable slot power connector is described in more detail in reference to FIG. 5.

Referring to FIG. 1A, it can be understood that according to various embodiments, the frame 102 can be configured to rest, for example, on a floor surface and to support the holding slots 104 in an orientation that, when resting on the floor surface, aligns their respective axes parallel to the floor surface.

FIG. 2A shows on the FIG. 1A projection plane a snapshot partially inserted position of laterally sackable HSS logic device 202 according to various embodiments. FIG. 2B shows, from FIG. 2A side-view projection 2B-2B, a side-profile configuration of the laterally stackable HSS logic device 202 in a cooperative engagement with the holding slot supporting guides.

FIG. 3 shows a front board surface view of one example configuration of a logic functionality generic structure 302 for laterally stackable, surface portioned. holding slot supportable hardware logic simulation circuit card devices according to various embodiments. The structure includes, as described above, a logic structure visibility improving allocation of device board surface, and laterally stackable power rail.

FIG. 4 shows, through overlay of side-projection 4-4 of FIG. 3 on an enlarged view of region "C" of the FIG. 2B example profile for holding slot upper guide-lower guide, a cooperative arrangement of holding slot upper guide—lower guide and slot supportable card device upper engagement—lower engagement structure for high visibility hardware simulation logic circuit bench apparatuses and methods according to various embodiments.

FIG. 5 shows a perspective view of a three holding slot configuration according to one or more embodiments. The configuration includes a first holding slot auxiliary card power rail driver 502A, second holding slot auxiliary card power rail driver 502B, and third holding slot auxiliary card power rail driver 502C,. A slot-generic per-slot auxiliary card power rail driver 502 is shown for the third holding slot auxiliary card power rail driver 502C. The example 502 comprises a power supply feed connection 504, a holding slot power rail connector 506 and, for example, to isolate holding slot electrical failures can include a fuse 508. The power supply feed connection 504 can connect, for example, to a voltage regulated power supply. It is contemplated that for various applications, all the auxiliary card power rail drivers 502A, 502B, and 502C can use the slot generic auxiliary card power rail driver 502.

Figure 6A:
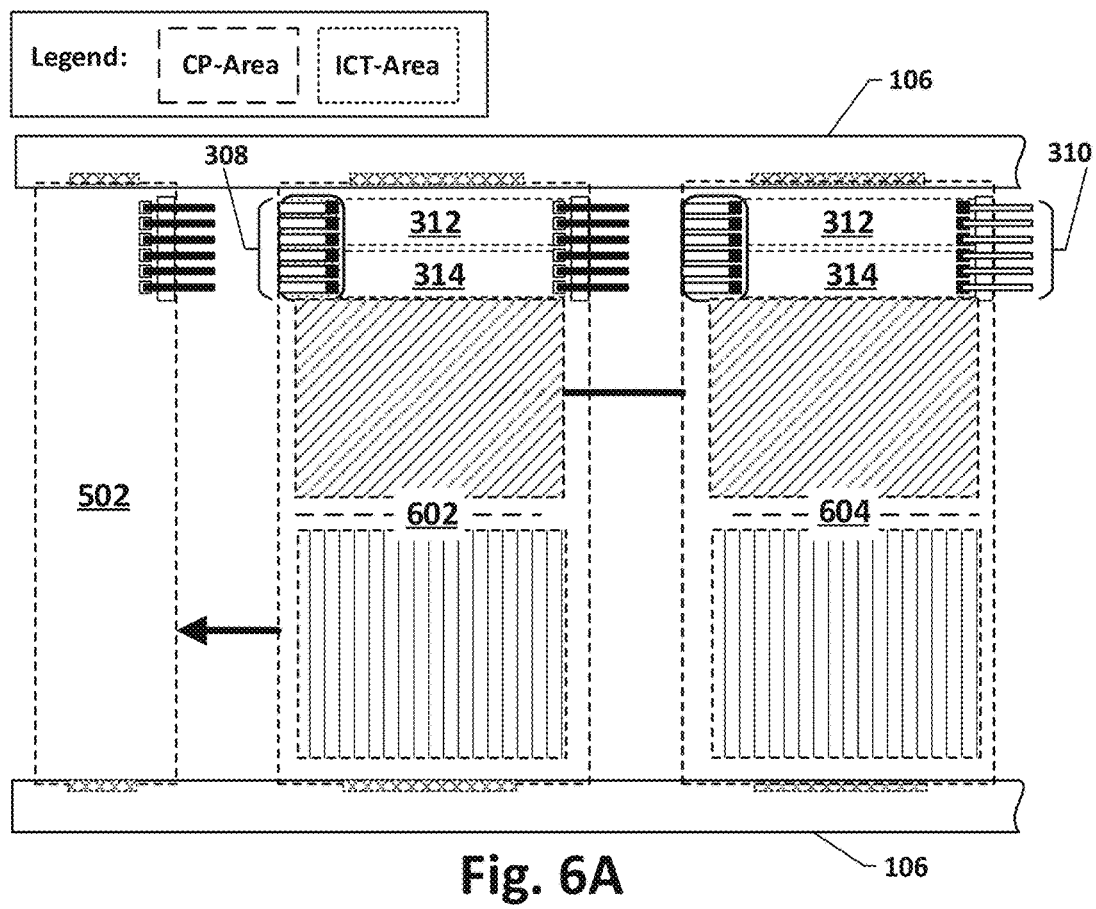
FIG. 6A shows a front board surface view of an arrangement, in an arbitrary one of the FIG. 5 example holding slots, of two separated laterally stackable, slot supportable hardware logic circuit card devices.

FIG. 6A shows a front board surface view of an arrangement, in an arbitrary one of the FIG. 5 example holding slots, of an example first laterally stackable, surface partitioned, slot supportable hardware logic circuit card device 602 and second laterally stackable, surface partitioned, slot supportable hardware logic circuit card device 604, collectively referenced as laterally stackable, surface partitioned, slot supportable hardware logic circuit card devices 602, 604. Each of the laterally stackable, surface partitioned, slot supportable hardware logic circuit card devices 602, 604 is structured as the FIG. 3 example, including a power rail segment supported by the substrate and comprising a power rail conductor 312, 314 extending from a first end proximal the first side edge to a second end proximal the second side edge, a first side edge rail connector 308 coupled to the first end, and a second side edge rail connector 310 coupled to the second end.

Figure 6B:
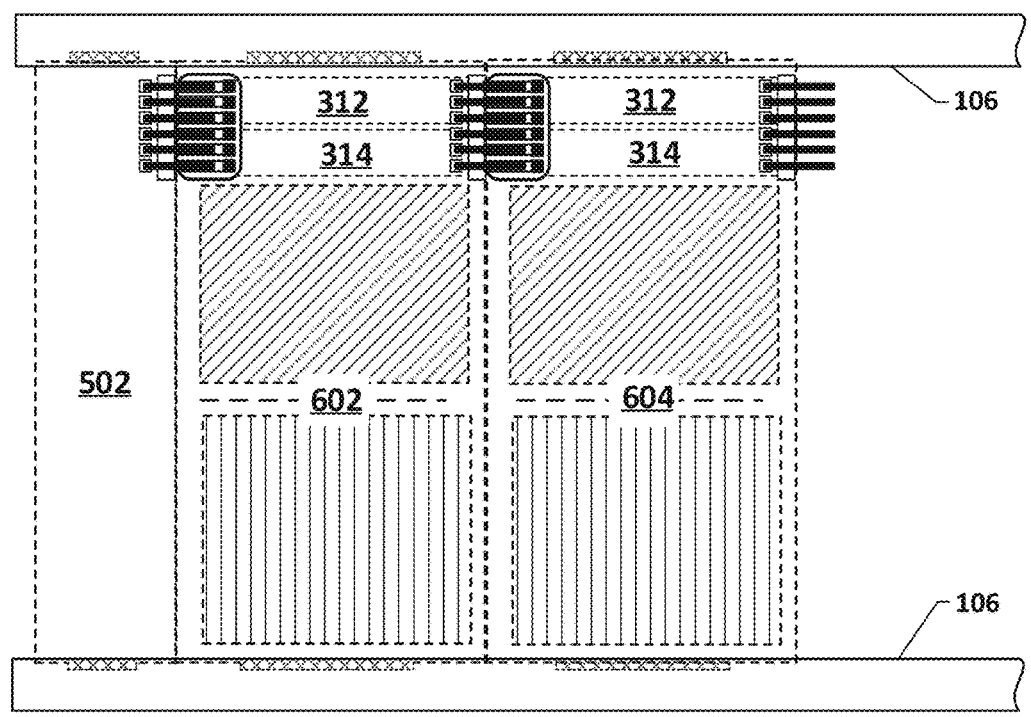
FIG. 6B shows a concurrently visible, laterally stacked state, on the auxiliary card power rail driver, of the two slot supportable hardware logic circuit card devices, according to one or more embodiments.

FIG. 6B shows a concurrently laterally stacked state, against and coupled to the auxiliary card power rail driver 502, of the two slot supportable hardware logic circuit card devices, according to one or more embodiments.

Figure 7A:
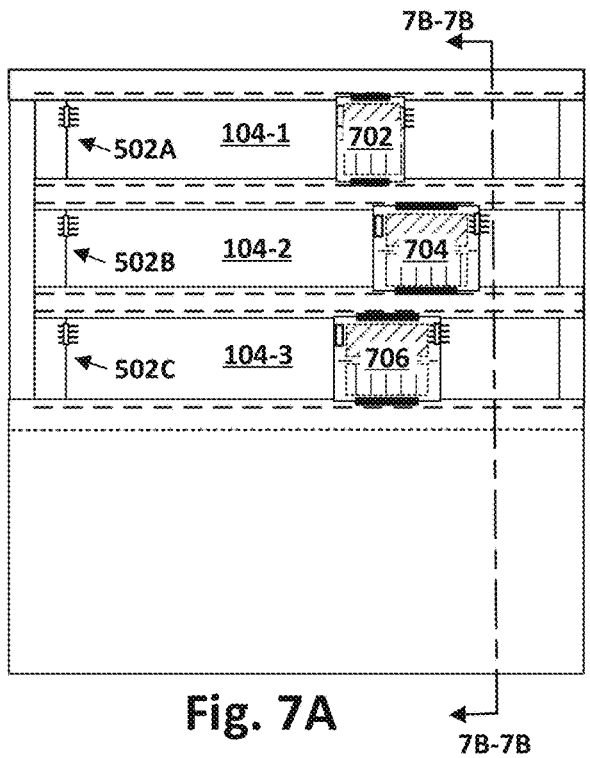
FIG. 7A shows a front projection of the FIG. 5 multiple slot example, in a state comprising the slots supporting laterally stackable, hardware logic circuit card devices separated from the slots' respective auxiliary card power rail driver.
Figure 7B:
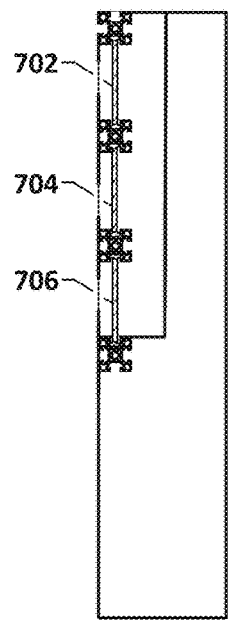
FIG. 7B shows, from FIG. 7A side-view projection 7B-7B, a side-profile of cooperative engagement between the holding slots and the laterally stackable, hardware logic circuit card devices.

FIG. 7A shows a front projection of the FIG. 5 multiple slot example, in a state comprising, in the first slot 104-1, laterally stackable, partitioned surface, slot supportable input type hardware logic circuit card device 702 and, in the second slot 104-2, laterally stackable, partitioned surface, slot supportable controller type hardware logic circuit card device 704 and, in the third holding slot 104-3, laterally stackable, partitioned surface, slot supportable output type hardware logic circuit card device 708. The described devices 702, 704, and 706 are separated from one another and from the slots' respective auxiliary card power rail drivers. 502A, 502B, and 502C. FIG. 7B shows, from FIG. 7A side-view projection 7B-7B, a side-profile of cooperative engagement between the holding slots and the laterally stackable, hardware logic circuit card devices.

Figure 8A:
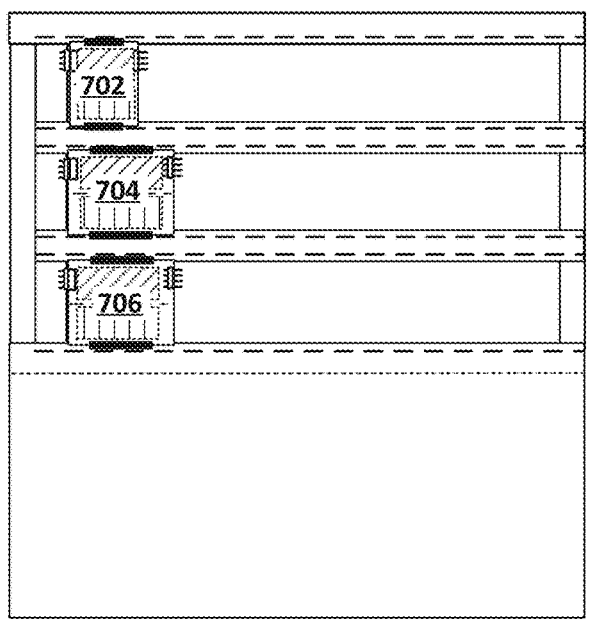
FIG. 8A shows a front projection of the FIG. 7A arrangement, in a power-coupled state comprising the laterally stackable, hardware logic circuit card devices coupled to the slots' respective auxiliary card power rail driver.
Figure 8B:
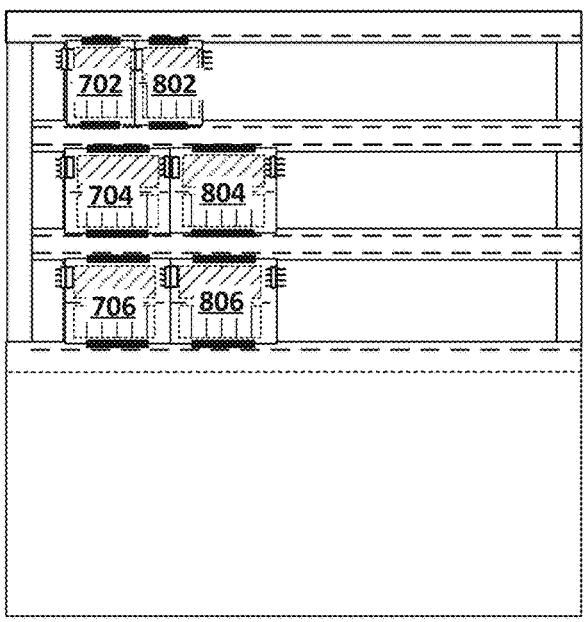
FIG. 8B shows, from the FIG. 8A front projection, a two-device multiple stacking in each of the holding slots.

FIG. 8A shows a front projection of the FIG. 7A arrangement, in a power-coupled state comprising the laterally stackable, hardware logic circuit card devices coupled to the slots' respective auxiliary card power rail driver; FIG. 8B shows, from the FIG. 8A front projection, a two-device multiple stacking in each of the holding slots, produced by inserting, for example, a second input type logic circuit device 802 into the first holding slot 104-1, and inserting its power rail first edge connector into the power rail second edge connector of device 702, inserting, for example, a second controller type logic circuit device 804 into the second holding slot 104-2, and inserting its power rail first edge connector into the power rail second edge connector of device 704, and inserting, for example, a second output type logic circuit device 806 into the third holding slot 104-3, and inserting its power rail first edge connector into the power rail second edge connector of device 706.

Example 1

Hardware Simulation Example

Figure 9:
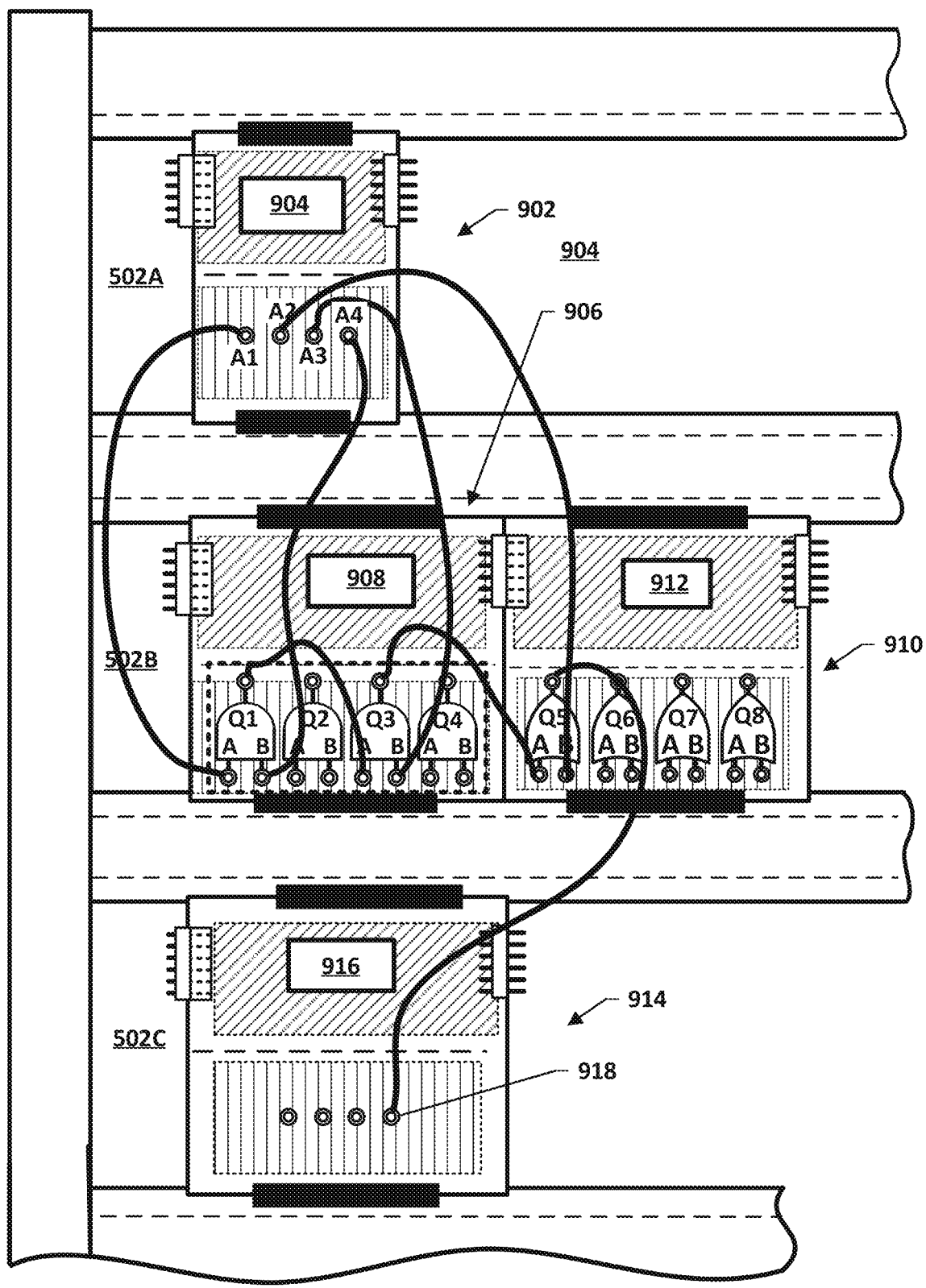
FIG. 9 show a front projection of one example simulation arrangement, using the three-slot embodiment example shown in FIG. 5, showing the first holding slot supporting and powering an example input logic type laterally stackable, hardware logic circuit card device, the second holding slot supporting and powering a lateral stacking of two different controller type hardware logic circuit card devices, and the third holding slot supporting and powering an example output logic type laterally stackable, hardware logic circuit card device.

FIG. 9 show a front projection view of one example simulation arrangement 900, on the three-slot embodiment as shown in FIG. 5. The first holding slot 104-1 supports and powers by auxiliary card power rail driver 502A an input logic type laterally stackable, partitioned surface hardware logic circuit card device 902 having input signal generating circuitry 904 that feeds four banana plug connectors in the user interact region, labeled A1, A2, A3, and A4. The second holding slot 104-2 supports and powers via auxiliary card power rail driver 502B a lateral stacking of two different controller type devices, one being a quad 2-input AND gate controller type 906, and other one quad 2-input OR gate controller type laterally stackable, partitioned surface area hardware logic circuit card device. The third holding slot 104-3 supports and couples to the power rail of an example output logic type laterally stackable, hardware logic circuit card device 914.

Benefits and advantages of the FIG. 9 simulation arrangement 900 include, for example and without limitation, immediately visible logic functionality of:

$$Q1 = A1 \cdot A3 \qquad \text{Eqn. (1)}$$

$$Q3 = Q1 \cdot A4 \qquad \text{Eqn. (2)}$$

$$Q5 = \text{Output} = Q3 + A2 \qquad \text{Eqn. (3)}$$

Example 2

Figure 10:
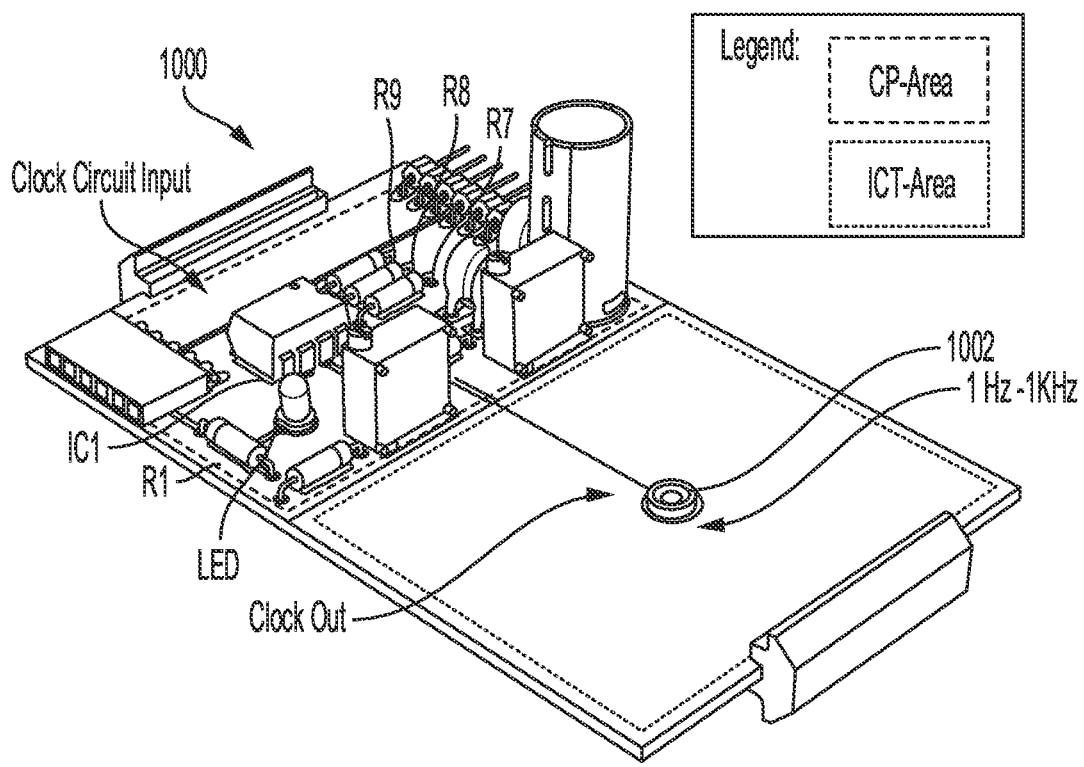
FIG. 10 shows a perspective view of one example configuration, including an exemplary user interact region and component support region, for a clock circuit input kind of input type logic circuit device, for user-interactive, high visibility logic structure, building block reconfigurable hardware simulation logic circuit bench apparatuses and methods according to one or more embodiments.

Example Structures for Input Logic Type, Holding Slot Supportable,

Laterally Stackable, Hardware Simulation Circuit Card Devices FIG. 10 shows a perspective view of one example configuration, including an exemplary user interact region and component support region, for a clock circuit input kind of input type logic circuit device 1000, for user-interactive, high visibility logic structure, partitioned surface region, building block reconfigurable hardware simulation logic circuit bench apparatuses and methods according to one or more embodiments.

Figure 11:
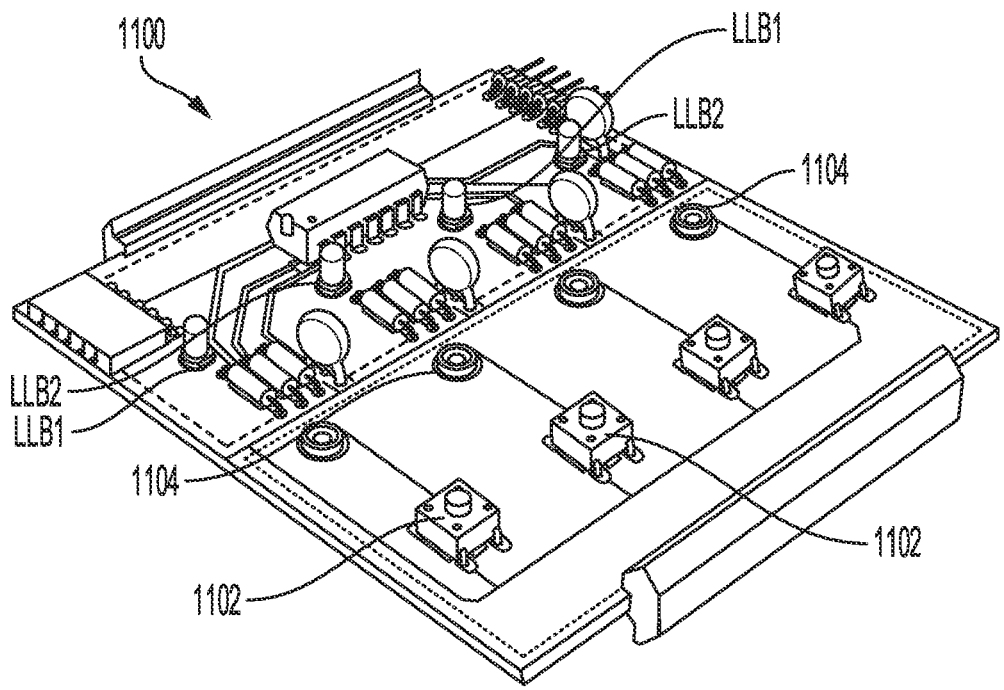
FIG. 11 shows a perspective view of one example configuration, including an exemplary user interact region and component support region, for a multi-bit push button kind of input logic circuit type device, for user-interactive, high visibility logic structure, building block reconfigurable hardware simulation logic circuit bench apparatuses and methods according to one or more embodiments.

FIG. 11 shows a perspective view of one example configuration, including an exemplary user interact region and component support region, for a multi-bit push button kind of input logic circuit type device 1100, for user-interactive, partitioned surface, high visibility logic structure, building block reconfigurable hardware simulation logic circuit bench apparatuses and methods according to one or more embodiments. The multi-bit push button input logic circuit type device 1100 includes integer 4 push buttons 1002, each controlling a corresponding one of integer 4 binary signal output banana connectors sockets.

Example 3

Figure 12:
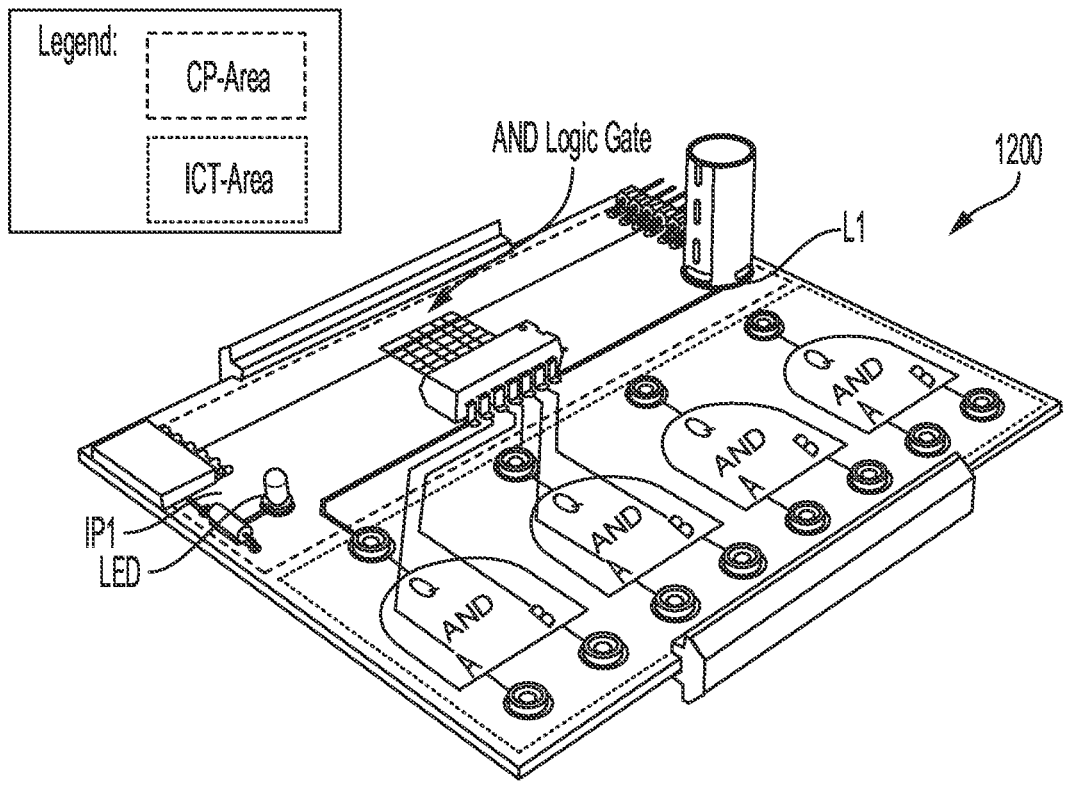
FIG. 12 shows a perspective view of an example configuration of a quad 2-input AND gate controller logic circuit device, for user-interactive, high visibility logic structure, building block reconfigurable hardware simulation logic circuit bench apparatuses and methods according to one or more embodiments.

Example Structures for Controller Logic Type, Holding Slot Supportable, Laterally Stackable, Hardware Simulation Circuit Card Devices FIG. 12 shows a perspective view of an example configuration of a quad 2-input AND gate controller logic circuit device 1200, for user-interactive, high visibility logic structure, building block reconfigurable hardware simulation logic circuit bench apparatuses and methods according to one or more embodiments.

Figure 13:
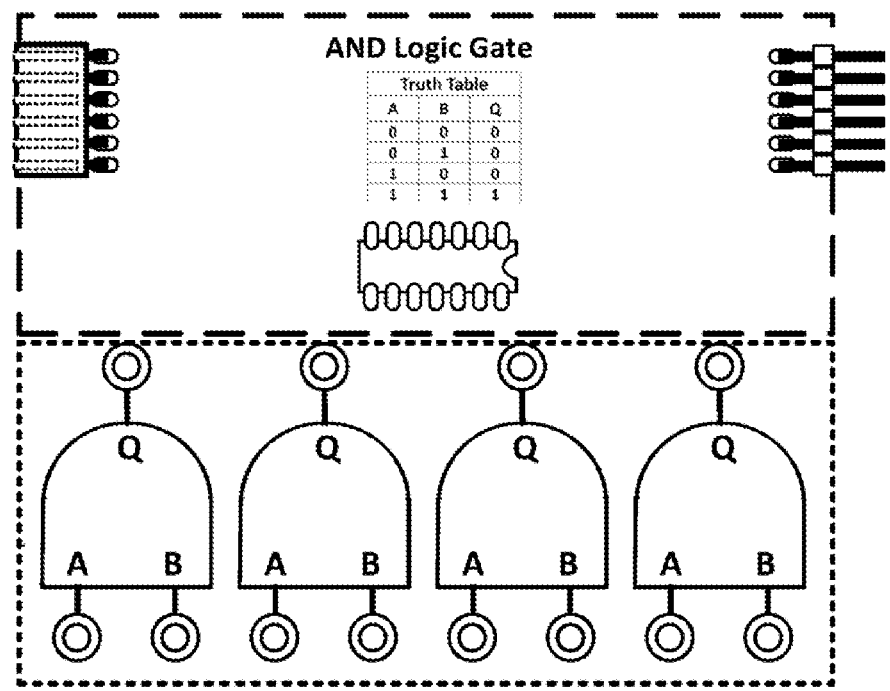
FIG. 13 shows a front projection view of one example board surface configuration of a user interact region-circuit component region partitioning of the FIG. 12 example quad 2-input AND gate controller logic circuit device accordance with various embodiments.

FIG. 13 show a front board surface view of one example configuration of a user interact region-circuit component region partitioning of the FIG. 12 example quad 2-input AND gate controller logic circuit device accordance with various embodiments.

Figure 14:
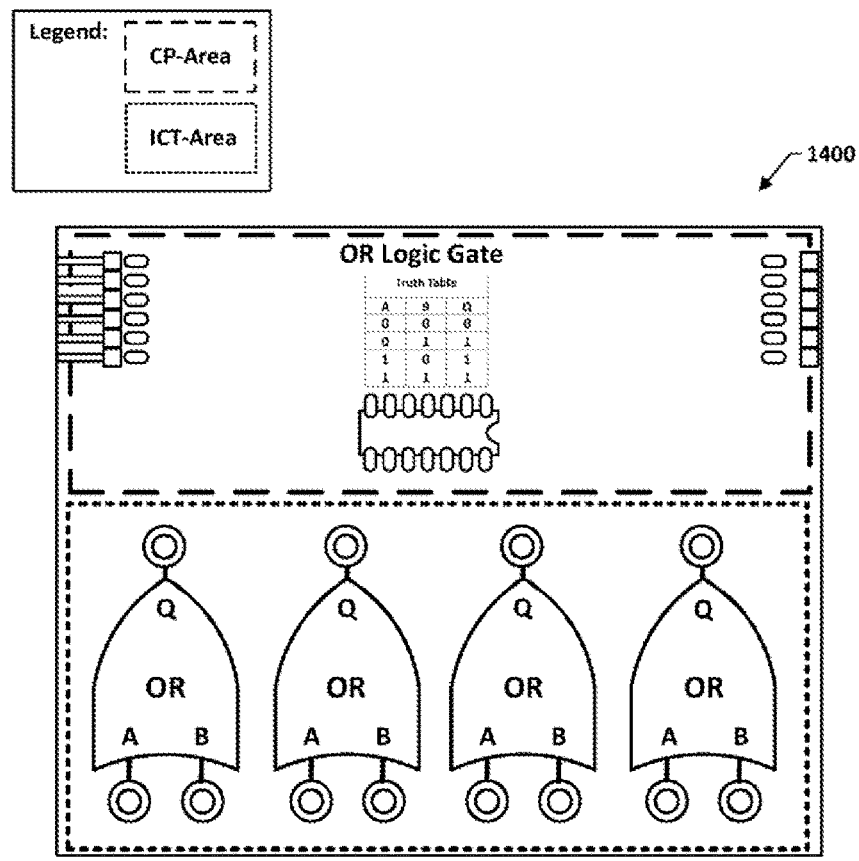
FIG. 14 show a front projection view of one example board surface configuration of a user interact region-circuit component region partitioning of one quad 2-input OR gate controller logic circuit device for user-interactive, high visibility logic structure, building block reconfigurable hardware simulation logic circuit bench apparatuses and methods according to one or more embodiments.

FIG. 14 show a front board surface view of one example configuration of a user interact region-circuit component region partitioning of one quad 2-input OR gate controller logic circuit device 1400 for user-interactive, high visibility logic structure, building block reconfigurable hardware simulation logic circuit bench apparatuses and methods according to one or more embodiments.

Example 4

Figure 15:
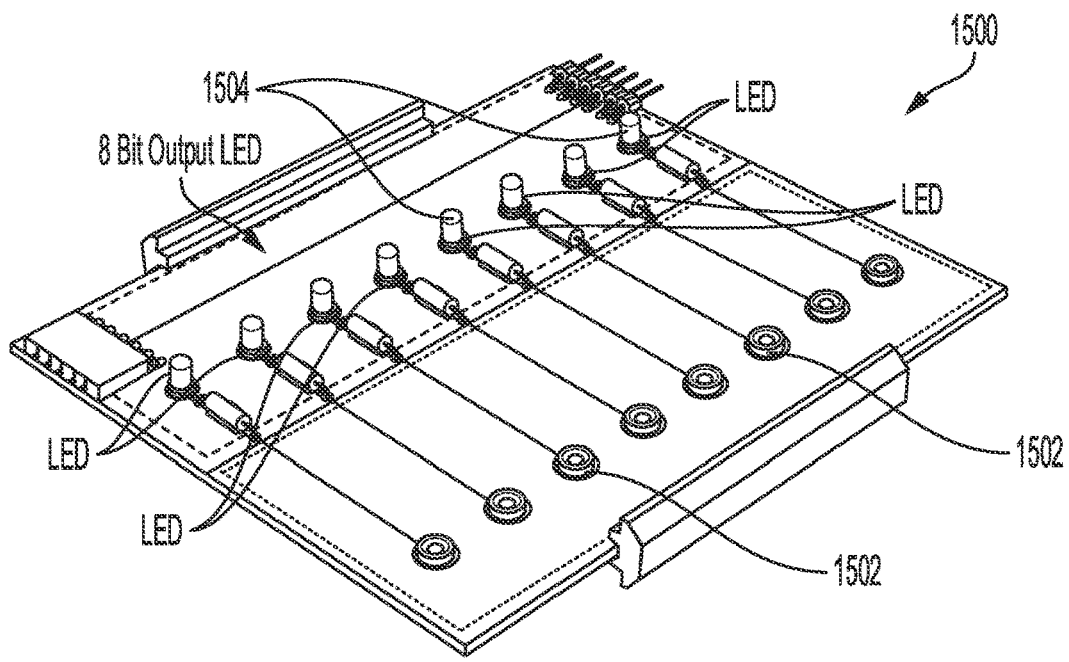
FIG. 15 shows a perspective view of an example configuration of one example output logic device comprising an 8-bit output for energizing an 8-segment light emitting diode (LED), for user-interactive, high visibility logic structure, building block reconfigurable hardware simulation logic circuit bench apparatuses and methods according to one or more embodiments.

Example Structures for Output Logic Type, Holding Slot Supportable, Laterally Stackable, Hardware Simulation Circuit Card Devices FIG. 15 shows a perspective view of an example configuration of one example output logic device 1500 comprising an 8-bit output, via integer 8 banana plug sockets 1502 for energizing an 8-segment light emitting diode (LED), for user-interactive, high visibility logic structure, building block reconfigurable hardware simulation logic circuit bench apparatuses and methods according to one or more embodiments Example 5

A Three-Slot, User-Interactive, High Visibility Hardware Logic Circuit Simulation of a "Three-Out-Of-Four" Fault Tolerant Door Sensor Governed Actuator a Using Toggle Switch This example assumes assigning a hypothetical student a hypothetical technical problem having a logic circuit solution that can be hardware simulated on a user-interactive, high visibility hardware logic circuit simulation bench in accordance with one or more embodiments. It will be understood that the described assigned technical problem is arbitrarily selected and that neither the hypothetical technical problem nor the technical solution the hypothetical student identifies and simulates are intended as any limitation on the scope of practices or of applications of practices in accordance with disclosed embodiments. The example is only for purposes of providing, through illustration, further perspective and understanding of disclosed concepts.

The hypothetical technical problem is a fault tolerant, door-position based power switch enabler-disabler logic. It will be assumed the student's proposed solution is an "M out of N" voting scheme, using a population of integer N door position sensors feeding a logic that enables the power if at least an integer M threshold is met, . The example assumes the student's proposed solution is a "three out of four" sensor logic scheme, using integer 4 door position sensors, which disables the power switch unless at least three of the four sensors indicate the door is closed. The example assumes the student creates a truth table, using "A," "B", "C, and "D," as the respective outputs of the four position sensors and identifies one solution as corresponding to Eqn. (4) below.

$$\text{Enable}=(A \cdot B \cdot C)+(A \cdot B \cdot D)+(A \cdot C \cdot D)+(B \cdot C \cdot D) \quad \text{Eqn. (4)}$$

As visible from Eqn. (1). an implementation can use integer 4 three-input AND gates in combination with one four-input OR gate. For purposes of illustration, though, it is assumed that the hardware library configuration of the interactive, high visibility hardware logic circuit simulation bench the student is using comprises two-input AND gate and two-input OR gate controller type logic circuit card devices, such as the above-described FIG. 11-12 integer 4 AND gate device 1100 and the FIG. 13 integer 4 OR gate device 1300. The student, using conventional logic truth table techniques, can readily re-form the Eqn. (4) relation into a two-input AND gate and two-input OR gate form, such as Eqn. (5)

$$\text{Enable}=((A \cdot B) \cdot (C+D))+((C \cdot D) \cdot (A+B)) \quad \text{Eqn. (5)}$$

Figure 16:
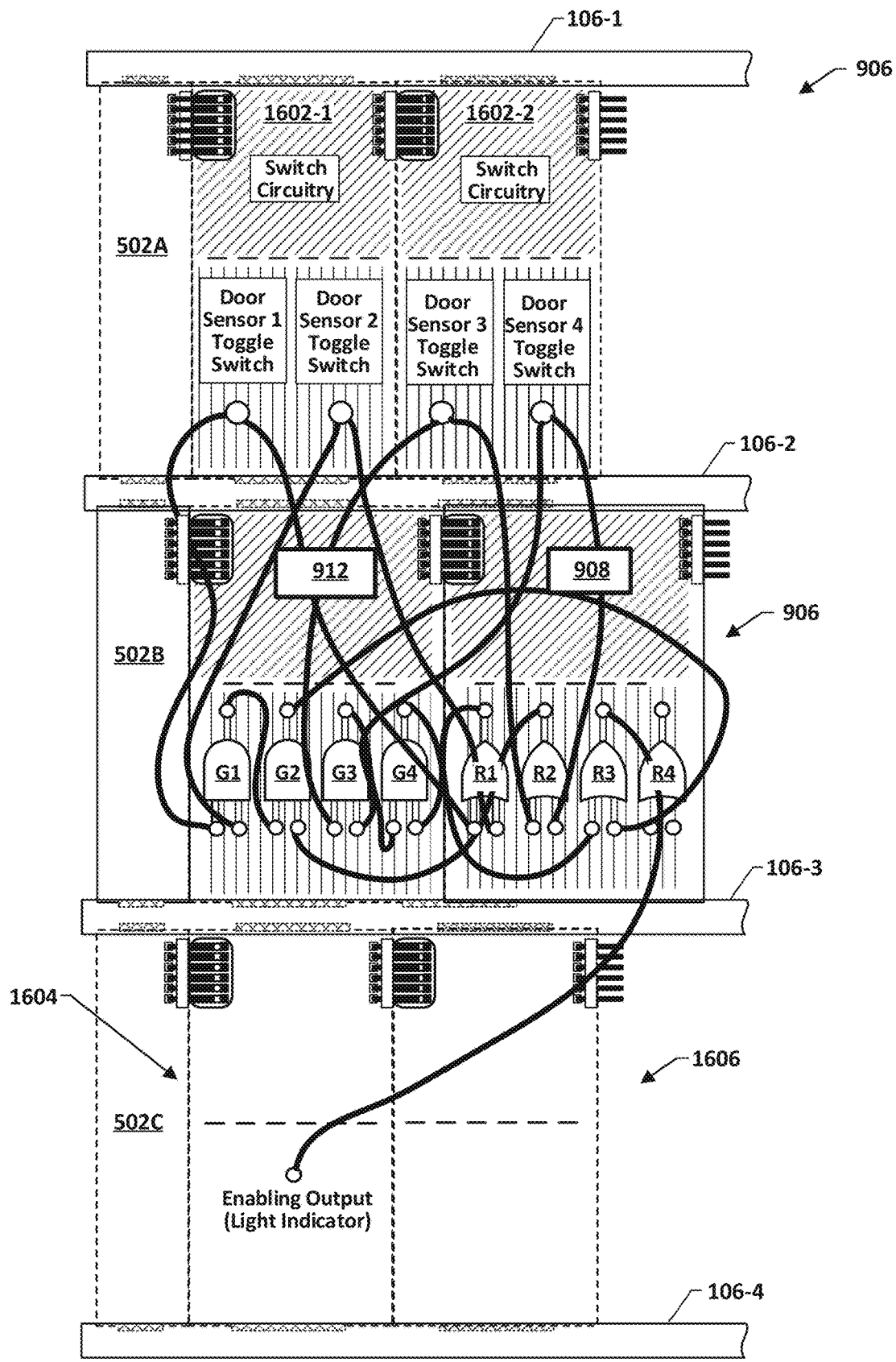
FIG. 16 shows a front projection view of a hardware simulation logic circuit, hypothetically constructed by a hypothetical student for verifying a hypothetical student-designed fault tolerant "3 out of 4" power switch enabler—disabler, using for description the three holding slot example configurations of FIGS. 1A-1B and FIG. 5, in combination with the FIG. 12-13 example holding slot supportable, laterally stackable quad 2-input AND gate controller logic circuit device and the FIG. 13 example holding slot supportable, laterally stackable quad 2-input OR gate controller logic circuit device.

FIG. 16 shows a front projection view of one example implementation of a user-interactive, high visibility hardware simulation logic circuit bench 1600 according to various embodiments that aspects, using the integer 3 holding slot configuration of FIGS. 1A-1B, with the FIG. 12-13 example quad 2-bit AND gate controller logic circuit device and the FIG. 14 example quad 2-bit OR gate controller logic circuit device, provides ready hardware simulation of a fault tolerant "3 out of 4" power switch enabler—disabler logic.

Example 6

A Three-Slot, User-Interactive, High Visibility Hardware Logic Circuit Library Bin FIG. 17A shows a snapshot state in an example configuring, via selecting appropriate holding slot supported logic circuit card devices from library bins of a further configured version of the FIG. 5 multiple logic type hardware logic circuit card device library, of a user-interactive, high visibility hardware simulation logic circuit bench according to various embodiments. Further configuration can include an input logic type library bin 1702A, a controller logic type library bin 1702B. and an output logic type library bin 1702C. One example process can start with a hypothetical assignment to a fictional student of a problem solvable by a sequential state machine, with instructions that the machine be constructed with JK flip-flops and combinational logic. Depending on the configurations available in the library bins 1702A, 1702B, and 1702C, the fictional student may need adapt solution to be doable with available resources.

The fictional student can then figure out a practical partitioning or distribution of the solution among available logic types in the library resources. Another aspect of the solution may pertain to ordering of the respective logic types within the holding slots. For example, assuming a solution includes. in the second holding slot 104-2, integer 3 quad 2-bit AND gates, a 4 bit adder, and a 4 bit clocked register, the fictional student may discover that routing of the interconnects is much easer in some orderings than others.

FIG. 17B shows a subsequent snapshot of a subsequent, still-not-fully assembled state, of all selected library resource hardware logic circuit card devices inserted in and supported by the holding slots; and FIG. 17C shows an example assembled configuration of the selected and inserted holding slot supported logic circuit card devices from the library.

Example 7

Figure 18:
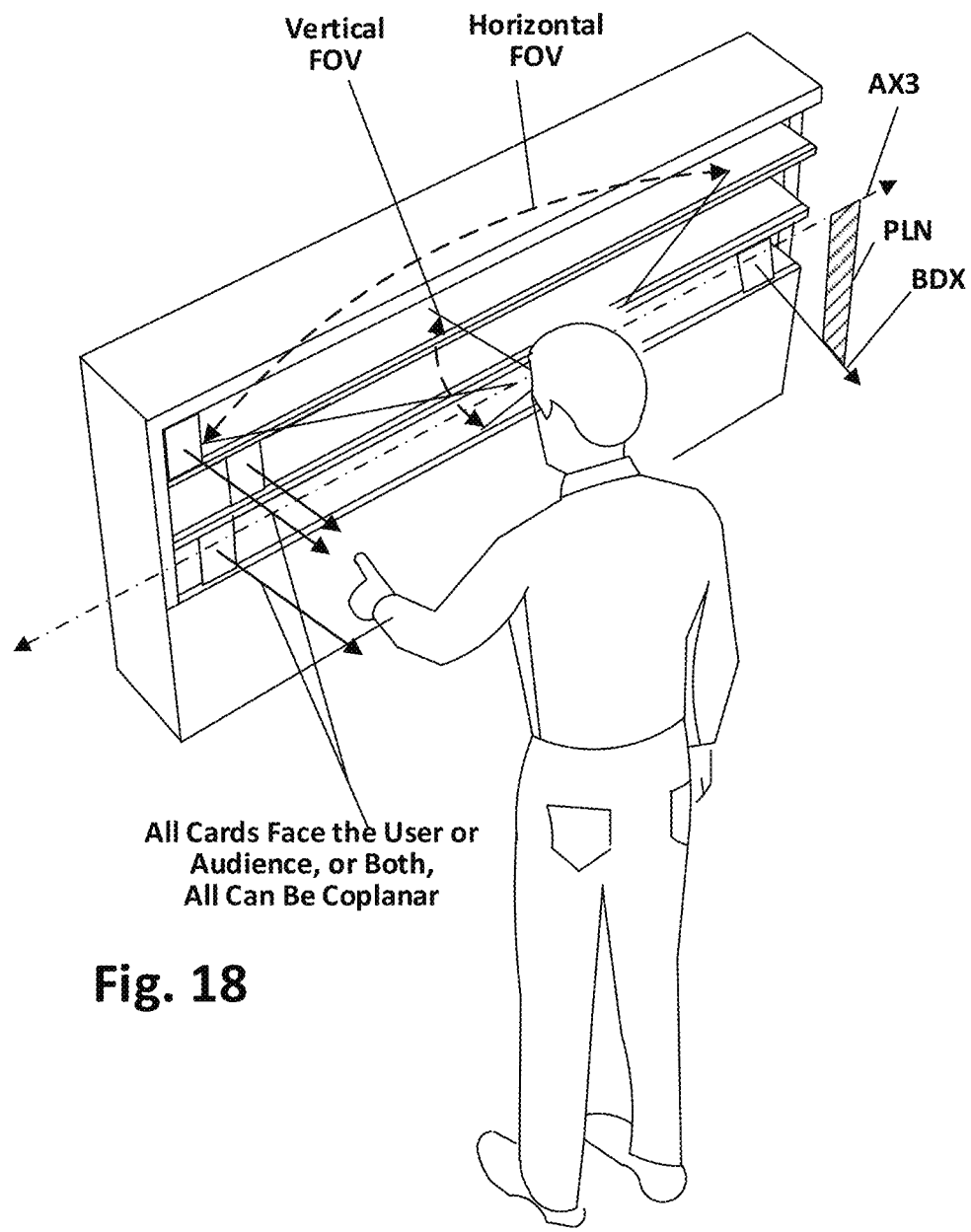
FIG. 18 shows a relative positioning of a user and an example configuration of a user-interactive, high visibility hardware simulation logic circuit bench showing, for example and without limitation, wide horizontal field of view (HFOV) and high vertical field of view (VFOV) afforded the user and audience.

System Arrangement, e.g., In a Classroom, of a User and Three-Slot, User-Interactive, High Visibility Hardware Logic Circuit Simulation Bench FIG. 18 shows a relative positioning of a user and an example configuration of a user-interactive, high visibility hardware simulation logic circuit bench showing, for example and without limitation, wide horizontal field of view (HFOV) and high vertical field of view (VFOV) afforded the user and audience.

As illustrated in FIG. 18, the slot-supported circuit board devices form respective board surfaces, each facing in a board facing direction that is normal to the axis AX of their respective holding slot. Also, as shown by reference plane PLN, passing through the board facing direction BDX and the third holding slot axis AX3, the board facing direction and the axis can extend in a common plane, which can be parallel to the floor surface on which the drawn persons is standing.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one, or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

We claim:

1. A reconfigurable hardware logic circuit simulator bench, comprising
    a frame;
    a holding slot, supported by the frame and extending along an axis from a holding slot base end and comprising guide surfaces that extend parallel to the axis;
    a slot power connector, supported by the frame, and arranged at the holding slot base end;
    a plurality of slot-supported circuit board devices, arranged in the holding slot and moveably supported by the guide surfaces, one of the slot-supported circuit board devices being a slot supported first circuit board device, and another of the slot-supported circuit board devices being a slot supported second circuit board device, each slot-supported circuit board device comprising:
        a substrate extending a width along the axis from a first side edge to a second side edge,
        a guide engagement structure secured to the substrate and configured to moveably engage the guide surfaces, and
        a power rail segment, supported by the substrate and comprising:
            a power rail conductor extending from a first end proximal the first side edge to a second end proximal the second side edge,
            a first side edge rail connector coupled to the first end, and
            a second side edge rail connector coupled to the second end, wherein:
    the slot-supported first circuit board device is adjacent the slot power connector,
    the slot-supported second circuit board device is adjacent the slot-supported first circuit board device,
    the first side edge rail connector of the slot-supported first circuit board device is aligned with and reversibly coupled to the slot power rail connector, and
    the second side edge rail connector of the slot-supported first circuit board device is aligned with and reversibly coupled to the first side edge rail connector of the slot-supported second circuit board device.

2. The reconfigurable hardware logic circuit simulator bench of claim 1, wherein the frame comprises structure configured to rest on a floor surface and to support the holding slot in an orientation that, and when resting on the floor surface, aligns the axis parallel to the floor surface.

3. The reconfigurable hardware logic circuit simulator bench of claim 2, wherein the guide surfaces comprise a lower linear guide surface and an upper linear guide surface, separated from one another by a slot height that is normal to the axis of the holding slot, and the guide engagement structure of the slot-supported circuit board devices is configured to movably engage with the upper linear guide surface and the lower linear guide surface, in an engagement configuration that movably supports and enables manually exerted movement of the slot-supported second circuit board device in a direction away from and uncoupling the first side edge rail connector of the slot-supported second circuit board device from the second side edge rail connector of the slot-supported first circuit board device.

4. The reconfigurable hardware logic circuit simulator bench of claim 3, wherein:

the slot-supported first circuit board device forms a first board surface that faces in a board facing direction that is normal to the axis, the board facing direction and the axis extend in a common plane that is parallel to the floor surface.

5. The reconfigurable hardware logic circuit simulator bench of claim 1, wherein:

the guide surfaces comprise a lower linear guide surface and an upper linear guide surface, separated from one another by a slot height that is normal to the axis of the holding slot, and the guide engagement structure of the slot-supported circuit board devices comprises an upper guide engagement structure and a lower guide engagement structure, each secured to the substrate and configured to engage and be moveable within and along, concurrently, the upper linear guide surface and the lower linear guide surface.

6. The reconfigurable hardware logic circuit simulator bench of claim 5, wherein:

the plurality of slot-supported circuit board devices further includes a slot-supported third circuit board device arranged in the holding slot and moveably supported by the linear guide surfaces, the first side edge rail connector of the slot-supported third circuit board device is concurrently aligned with, faces directly toward, and spaced apart from the second side edge connector of the slot-supported second circuit board device, the lower linear guide surface, the upper linear guide surface, the upper guide engagement structure, and the lower guide engagement structure are configured to movably support a manual movement of the slot-supported third circuit board device a direction toward the slot power rail connector, to a position coupling the first edge connector of the slot-supported third circuit board device to the second edge connector of the slot-supported second circuit board device.

7. The reconfigurable hardware logic circuit simulator bench of claim 6, wherein the holding slot extends a holding slot length along the axis, away from the holding slot base end, and the holding slot structure comprises an escapement structure that facilitates manual removal from the holding slot of slot-supported circuit board devices.

8. The reconfigurable hardware logic circuit simulator bench of claim 1, wherein the holding slot is a first holding slot, the axis is a first axis, the slot power connector is a first slot power connector and the slot base end is a first slot base end, and the reconfigurable hardware logic circuit simulator bench further comprises:

a second holding slot, also supported by the frame, extending along a second axis from a second holding slot base end and comprising second slot guide surfaces that extend parallel to the second axis; and a second slot power connector, supported by the frame, and arranged at the second slot base end, wherein:

the first axis and the second axis are mutually parallel and mutually co-planar, the plurality of slot-supported circuit board devices, arranged in the first holding slot are a plurality of first logic types of slot-supported circuit board devices, and the reconfigurable hardware logic circuit simulator bench further comprises a plurality of second logic type slot-supported circuit board devices, arranged in the second holding slot and moveably supported by the second slot guide surfaces, each second logic type slot-supported circuit board device comprising:

a respective second logic type device substrate extending a second width along the second axis from a second logic type device substrate first side edge to a second logic type device substrate second side edge, and a respective guide engagement structure secured to the respective second logic type device substrate and configured to moveably engage with and be moveable along the second slot guide surfaces, and wherein:

the plurality of first logic type slot-supported circuit board devices, arranged in the first holding slot and moveably supported by the first slot guide surfaces each have a first logic type partitioned board surface, each comprising a first logic type component surface region and a first logic type user interface region, the plurality of second logic type slot-supported circuit board devices, arranged in the second holding slot and moveably supported by the second slot guide surfaces have a respective second logic type partitioned board surface, each comprising a respective second logic type component surfaces region and a respective second logic type user interface region, the first logic type partitioned board surface of the first logic type slot-supported circuit board device, while arranged in the first holding slot and moveably supported by the first slot guide surfaces faces outward from the first holding slot in a mutually aligned facing direction, and the second logic type partitioned board surface of the second logic type slot-supported circuit board device, while arranged in the second holding slot and moveably supported by the second slot guide surfaces, faces outward from the second holding slot in the mutually aligned facing direction.

9. The reconfigurable hardware logic circuit simulator bench of claim 1, further comprising:

a logic circuit card hardware library container, attached to or integrated within the frame, configured with a capacity to hold a population of different slot-supported logic circuit board devices, each comprising respective structure according to the slot-supported circuit board devices, wherein:

the population of different slot-supported logic circuit board devices includes a population of first type logic circuit card devices, a population of second type logic circuit devices, and a population of third type logic circuit card devices, the population of first type logic circuit card devices includes a first specification input type logic circuit card device and a second specification input type logic circuit card device, the first specification input type logic circuit card device being an input clock provisioning logic circuit card device, and the second specification input type logic circuit card device being another input clock provisioning circuit card device the first specification and the second specification each meeting a library input signal specification among a group of different library input signal specifications, the population of second type logic circuit card devices includes controller type logic circuit card devices, each configured with a controller logic functionality meeting a library controller specification among a group of different library controller specifications, and the population of third type logic circuit card devices includes output type logic circuit card devices, each configured with an output signal provisioning functionality meeting a library output signal specification among a group of different library output signal specifications.

10. The reconfigurable hardware logic circuit simulator bench of claim 9, wherein: the substrate of each of the input type circuit board devices is configured with a an input type component support surface and an input type user interact surface, and the input type circuit board devices comprise:

mounted on the input type component support surface, any one among, or any combination or sub-combination of a push button switch, a slide switch, and/or a clock generating device, and mounted on the input type user interact surface, at least one input type board cable receptacle, which is coupled to a least one component mounted on the input type component support surface.

11. The reconfigurable hardware logic circuit simulator bench of claim 10, wherein: the substrate of each of the second slot supported circuit board devices is configured to provide a control type component support surface and, separate from the control type component support surface, a control type user interact surface, and the second slot supported circuit board devices comprise:

mounted on the control type component support surface, another at least one releasable chip socket, configured to releasably mount any among, or any combination of or sub-combination of a separate flip-flop circuit device, a separate logical AND circuit device, and/or a separate logical OR circuit device, and mounted on the control type user interact surface, a plurality of control type user interact cable receptacles, at least one of the control type user interact cable receptacles being coupled to a corresponding pin receptacle of the another at least one releasable chip socket.

12. The reconfigurable hardware logic circuit simulator bench of claim 1, wherein the substrate of at least one of the slot supported circuit board devices is configured to provide a component support surface and, separate from the component support surface, a user interact surface, and the at least one of the slot supported circuit board devices comprises:

mounted on the component support surface, at least one releasable chip socket, and mounted on the user interact surface, at least one user interact cable receptacle being coupled to a corresponding pin receptacle of the at least one releasable chip socket.

13. The reconfigurable hardware logic circuit simulator bench of claim 8, further comprising:

a third holding slot, also supported by the frame, extending along a third axis from a third holding slot base end and comprising third holding slot guide surfaces that extend parallel to the third axis;

a third slot power connector, supported by the frame, and arranged at the third holding slot base end; and a third logic type slot-supported circuit board device, arranged in the third holding slot and moveably supported by the third slot guide surfaces, and and comprising:

a respective power rail conductor extending from a respective first end proximal the second logic type device first side edge to a respective second end proximal the second type logic device second side edge, a respective first side edge rail connector coupled to the respective first end, and a respective second side edge rail connector coupled to the respective second end.

* * * * *